2,510,770

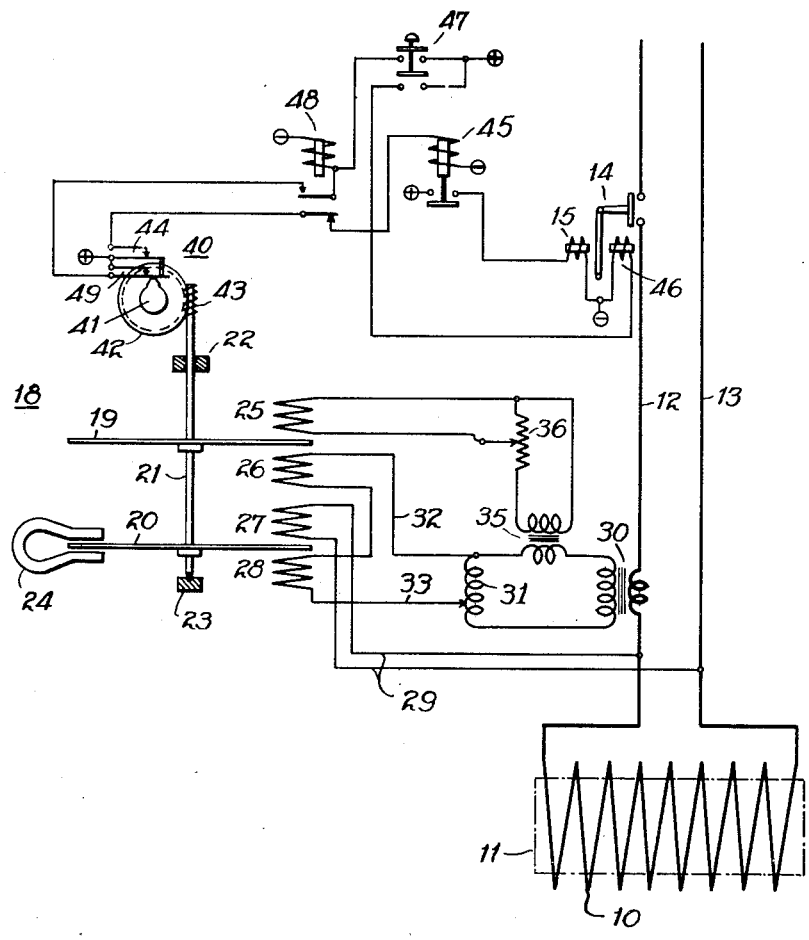
June 6, 1950 — D. I. BOHN — 2,510,770
INDUCTION HEATING CONTROL MECHANISM
Filed Dec. 11, 1946
INVENTOR
Donald I. Bohn
BY Howard B. Funk
ATTORNEY Patented June 6, 1950

UNITED STATES PATENT OFFICE 2,510,770

INDUCTION HEATING CONTROL MECHANISM

Donald I. Bohn, Pittsburgh, Pa., assignor to Aluminum Company of America, Pittsburgh, Pa., a corporation of Pennsylvania Application December 11, 1946, Serial No. 715,380

8 Claims. (Cl. 219—47)

This invention relates to control mechanism for induction heating apparatus especially to the type known as coreless induction heaters, and it relates more particularly to a power measuring type of control therefor.

The invention is hereinafter described in connection with the heating of aluminum ingots or billets to prepare them thermally for a hot working operation, such as extrusion, but this, is merely an exemplification.

The heating unit for induction heating consists of a heating coil usually referred to as the inductor or induction coil with which the work to be heated is adapted to be magnetically coupled by being inserted in the open center thereof. One of the difficulties experienced with this heating method is that of directly measuring the amount of heat passed into the work so as to permit shutting off the power input to the inductor on the basis of energy expended in the work in order to assure heating of the work to the desired temperature. Because of this difficulty, it has been suggested to provide a power measuring device which would measure the energy supplied to the inductor and cut off the power after the kilowatt hours input has reached a predetermined amount. Since the temperature rise of a given piece of work is a function of its weight, specific heat and the electrical energy which it actually receives, this expedient requires that conditions such as line voltage, resistivity, dimensions and configuration of the work, electrical losses in the inductor, etc., be constant, otherwise undesirably large errors or variation in temperature of the work will result.

An object of the invention is to provide a simple and effective power metering control for cutting off the power to the inductor after a predetermined number of kilowatt hours have been actually transferred to the work so that the work will be heated to a predetermined temperature.

Another object of the invention is to provide a metering device whose torque is made proportional to the net watts being received by the work being heated inductively and operates to cut off power to the inductor on the basis of total net power received by the work.

A further object of the invention is to provide a polyphase watthour meter of cutting off power input to an inductor that functions to determine the point of cut off in accordance with the difference between the total power input and the total $I^2R$ losses in the inductor.

Further objects and advantages of the invention will be made apparent in the following detailed description thereof, references in this connection being had to the accompanying drawing, wherein the single figure is a diagrammatic showing of an induction heater with its power supply circuit and control mechanism incorporating the invention.

Referring to the drawing, the numeral 10 indicates an inductor which preferably consists of copper tubing wound into a coil of suitable shape to receive billet 11 or other article to be heated, and connected for flow of cooling water therethrough by suitable water connections, not shown. The inductor is supplied with power from a suitable A. C. power source through power leads 12 and 13, a suitable power cut off switch or contactor 14 having a pull out solenoid 15 being provided in the power circuit to the inductor. The power source may be of any desired voltage and frequency, 60 cycle energy being suitable.

The billet 11 serves as a secondary and has currents induced therein which effect the heating thereof. The energy induced in the billet or the power received thereby represents the difference between the power input to the inductor and the power loss in the inductor. Variations in energy supply and losses in the primary will be reflected in varying energy received by the billet. According to the objects of this invention, means are provided to effect cutoff of the power input to the inductor responsively to net kilowatt hours of energy received by the billet. For this purpose, power measuring devices, constituting a watthour meter control device represented by the numeral 18, are provided and the construction thereof preferably conforms to standard induction watthour meter construction. As here shown diagrammatically, the meter comprises upper disc 19, lower disc 20 both secured to a common vertical shaft 21 journalled in upper and lower anti-friction bearings 22 and 23, respectively, and one or more damping magnets 24. Potential and current elements 25 and 26 consisting of suitable coils are associated with the upper disc 19 while similar potential and current elements or coils 27 and 28 are associated with the lower disc 20, the customary magnetic structure on which the respective sets of coils are mounted not being shown. These rotor discs and coil elements constitute two conjoined or interconnected meter devices that are adapted to cooperate with each other and by their combined action, as hereinafter described, measure the net kilowatt hours received by the billet.

It is contemplated that instead of the two meter devices being arranged one above the other and interconnected by means of common shaft 21, that they may be disposed side-by-side and by means of a differential gearing have their actions combined on a common output shaft, as employed in some polyphase watthour meter constructions. However, the arrangement shown is preferred because of its simplicity.

One meter, the lower one as here shown, has its voltage coil 27 connected by means of conductors 29 in shunt to or across the power conductors 12 and 13, and the voltage may be stepped down as desired by a suitable transformer. Current coils 26 and 28 are connected in series and energized from a current transformer 30 that is connected in power lead 12, the secondary of this transformer and a variable auto-transformer 31 being connected in loop circuit and the current coils being connected by conductors 32 and 33 to one side of the loop and to the adjusting arm of the variable transformer, respectively. Substantially step less variation in the effective ratio of current transformer 30 by a 2 to 1 ratio is provided by manual adjustment of transformer 31. The torque produced on disc 20 by the current and potential coils 27 and 28 is proportional to the power in the power circuit 12—13 so that this lower meter element measures the total power input to the inductor 10.

When inductor 10 is operating to effect heating of the billet 11, only a portion of the total energy received by the inductor is useful and appears in the billet. The difference between this useful energy and the total energy is represented by the electrical losses in the inductor and are, of course, represented by the $I^2R$ losses in the inductor, which due to variable electrical and load conditions encountered in commercial operations fluctuate considerably in value.

The upper meter element is utilized to evaluate this $I^2R$ energy expended in the inductor and subtract the same from the power input to the inductor, so as to determine the true energy received by the work. The coils 25 and 26 of this element are connected to provide a torque on disc 19 directly proportional to the energy loss in inductor 10 which means that it is directly proportional to the square of the current going through the inductor 10. To this end, voltage coil 25 is connected into the current circuit fed by the secondary of current transformer 30 through a second current transformer 35 and potentiometer 36.

Current coil 26 of the upper element, being connected to the secondary of current transformer 30, receives a current proportional to the current through the inductor 10. Current transformers 30 and 35 are so designed that their full load secondary currents will bear a predetermined fixed ratio, preferably about 10 to 1 so that, for example, with 5 amperes flowing through primary of transformer 35, the secondary current which it produces will be ½ ampere. A current of .5 ampere will be forced through the entire winding of potentiometer 36 when 5 amperes are flowing through the secondary of current transformer 30. Voltage coil 25 is connected to one terminal of the potentiometer 36 and to the adjusting arm 37 of the potentiometer, hence the coil is energized by an adjustable potential across the potentiometer. This potential is in phase with the current flowing through both the secondary and primary of current transformer 30 and to provide the necessary phase angle between the currents in coils 25 and 26 so that driving torque on disc 19 will be produced, the potential element is designed in usual fashion to constitute a circuit of substantially zero power factor.

It will be observed that since both current and voltage coils 25 and 26 are fed from current transformer 30, these coils will produce a torque on disc 19, which by proper adjustment of potentiometer 36 can be made exactly proportional to the square of the current flowing through the primary of transformer 30 and consequently proportional to the current squared in the inductor 10. The coil 25 is so connected with respect to its polarity that the torque produced on disc 19 opposes or bucks that produced on disc 20 so that the resultant torque on shaft 21 will represent the different between the power going into the inductor 10 and that represented by some constant times the square of the current going into the inductor 10. Adjustment of the potentiometer 36 is effected so that this latter may represent exactly the $I^2R$ losses in the inductor 10. Thereby the net positive torque of shaft 21 is made proportional to net kilowatt hours going into the work.

Adjustment of potentiometer 36 is effected with accuracy simply by applying power to the inductor 10 with billet 11 removed. Under these conditions, the $I^2R$ loss of the inductor 10 is the same as the watts loss therein. The potentiometer 36 is then adjusted manually until the opposed torques on discs 20 and 21 respectively, are equal; that is, until the discs and shaft show no tendency to rotate under the condition of no work in inductor 10. With this simple adjustment effected, the algebraic sum of the opposed torques will represent the net kilowatts going into a billet when it is being heated and this relationship remains unchanged regardless of variations in supply voltage, change in specific resistance of the material being heated, or any other variables which may exist with respect to the operation of a given inductor. As will be understood, the damping magnets 24 will cause the rotating speed of the discs to be proportional to the torques on the discs. Turning movement of the shaft 21 therefore, represents net kw. h. induced in the work.

In order to terminate a heating cycle or operation, opening of cut off switch 14 is effected whenever the kilowatt hours input to the billet, in terms of revolutions of shaft 21, reaches a predetermined value. This is suitably accomplished as shown by a meter actuated control element or switch 40 operated by a cam 41 driven from the shaft 21 by gearing including worm gear 42 meshing with worm 43 fixed on shaft 21, the gear ratio being such that shaft 21 makes a given number of revolutions for one full revolution of cam 41. At the end of its one revolution, cam 41 operates switch 40, whereby control contacts 44 of switch 40 closes a circuit for an interposed control relay 45 by operation of which the pull-out solenoid 15 is energized and power switch 14 tripped to open the power circuit to the inductor 10 and terminate the heating cycle. The switch 14 may suitably be provided with a closing solenoid 46 so it may be operated to close the power circuit and initiate a heating operation by operation of suitable means such as push switch 47. To take power off solenoid 15 when the switch 14 is to be closed, operation of push switch 47 closes a circuit for a relay 48 which energizes and opens a point in the circuit of relay 45 and this relay drops out to open the energizing circuit of the pull-out solenoid 15. The push-switch 47 need not be held depressed, since relay 48 completes a sealing circuit for itself that is controlled by contacts 49 of cam-actuated switch 40. Relay 48 remains energized to prevent reclosure of relay 45 and re-energization of solenoid 15 until cam 41 moves far enough to allow contacts 44 and 49 of control switch 40 to open, whereupon relay 48 drops out and places operation of solenoid 15 under control of contacts 44 for subsequent automatic termination of the heating operation, as above described. The auto-transformer 31 will be initially so adjusted to vary the power-torque ratio that during one full revolution of cam 41 a given amount of energy will be received by the billet. Any other suitable meter actuated means may be utilized to operate switch 14 to terminate a heating operation. A photoelectric counter mechanism responsive to rotation of shaft 21 has been found satisfactory for this purpose.

From the foregoing it will be appreciated that the several power measuring units of a polyphase watthour meter are used in such a mutually cooperative relation that the amount of kilowatt hours received by the work being inductively heated is accurately measured and that this, of course, is an accurate measure of the temperature rise of the work for any given size thereof. Not only is the total kw. h. supplied to the inductor accurately measured by the one metering unit, but the total kw. h. representing the nonproductive losses in the inductor is likewise accurately measured by the other metering unit, and due to the bucking or opposing action of the units, as described, the second is subtracted from the first and net positive rotation of the meter is rendered proportional to the net kw. h. induced in the work. The provision of the adjustable auto-transformer in the current circuit of the meter permits the current in the meter coils to be varied and hence, the torque for any given load in the inductor. By adjusting this power-torque ratio, the total energy received by the work during the heating cycle can be varied and thereby the temperature of the work increased or decreased; thus this auto-transformer gives a convenient temperature control for raising or lowering the temperature to which the billets will be heated.

While a particular embodiment of the invention has been illustrated and described, it will be apparent that modifications and substitutions of equivalents may be made without departure from the spirit and scope of the invention as defined in the appended claims.

What is claimed is:

1. In an induction heating apparatus having an inductor connected by a power circuit to a source of A. C. supply for heating a work piece disposed in inductive relation to said inductor, a first power measuring device electrically connected to said power circuit to measure the power supplied to said inductor, a second power measuring device electrically connected to said power circuit to measure the power loss in said inductor, a common output shaft differentially actuated by said measuring devices and means responsive to a predetermined number of revolutions of said shaft to cut off the power supplied to said inductor.

2. In an induction heating apparatus having an inductor adapted to be energized from an A. C. power circuit, a power measuring device having a rotatable shaft, means for imposing an operating torque on said shaft proportional to the power input into said inductor, means for imposing a second torque on said shaft, in opposition to said first named torque, proportional to the power expanded in said inductor in accordance with the current squared times the resistance, means to render the speed of rotation of said shaft proportional to the net torque imposed on said shaft, and means responsive to the rotation of said shaft to cut off the power supplied to said inductor and thereby terminate the heating of a work piece disposed in inductive relation to said inductor.

3. In an induction heating apparatus having an inductor adapted to be energized from an A. C. power circuit, a power measuring device having a rotatable shaft, means including electromagnetic elements electrically connected in said power circuit for imposing an operating torque on said shaft proportional to the power input into said inductor, means including electromagnetic elements electrically connected to said power circuit for imposing a second torque on said shaft, in opposition to said operating torque, proportional to the square of the current flowing in said inductor, means to render the speed of rotation of said shaft proportional to the net torque imposed on the shaft, means responsive to the rotation of said shaft to cut off power supplied to said inductor and thereby terminate the heating of a work piece in inductive relation to said inductor, and electrical means for adjusting the power-torque ratio between said power circuit and said electromagnetic elements.

4. Control mechanism for induction heating apparatus having an inductor and A. C. power supply circuit therefor, comprising a polyphase watthour meter including a first rotor disc and a second rotor disc mounted on a common shaft, potential and current coils associated with each of said discs, means for energizing the current and potential coils of said first rotor disc in accordance with the current and voltage, respectively, in said supply circuit to produce a torque on said first disc proportional to the power input into said inductor, the current coil of said second disc being connected in series with the current coil of said first disc, said energizing means including a current transformer having its secondary in loop circuit with an auto-transformer from which said series-connected current coils are energized, means including an adjustable resistor for energizing the potential coil of said second disc in accordance with the current in said loop circuit whereby the torque produced on said second disc is proportional to the current squared in said inductor, a control element operatively associated with said shaft for actuation thereby, and means actuated by operation of said control element to cut off power supplied to said inductor, the torque on said second rotor disc being in opposition to the torque on said first rotor disc.

5. In a control mechanism for an induction heating coil, the combination of a rotatable member, means including electromagnetic elements for imposing an operating torque on said member in proportion to the power supplied to said induction coil, means including other electromagnetic elements for imposing an opposed torque on said member in accordance with the electrical losses in said induction coil, means for varying the energization of said other electromagnetic elements and being adjusted initially with power supplied to and without work in said induction coil until the opposing torques on said rotatable member are equal, a switch for controlling supply of electrical power to said induction coil, and means controlled by said rotatable member for effecting operation of said switch to cut off the power supply to said induction coil.

6. In an apparatus of the character described, the combination with a coreless induction heating coil and an A. C. power supply circuit therefor, of two differentially related induction watthour meters, each circuit-connected to said supply circuit, one to measure the power input into said induction coil and the other to measure the power expended in said induction coil in accordance with the current square times the resistance, an adjustable impedance in the connecting circuit of the other of said meters for adjusting the metering action of said meters to zero motion with said induction coil energized without a work piece load, so that thereafter their action represents net energy induced in a work piece placed in inductive relation to said induction coil for heating, and means under the control of said meters for terminating the heating operation.

7. In an induction heating apparatus having an inductor fed from an A. C. supply for heating a work piece disposed in inductive relation to said inductor, the combination with said inductor, of a watthour meter responsive to the power input into said inductor, a second watthour meter responsive to the power expended in said inductor, in accordance with the current squared times the resistance, and means including means differentially actuated by said meters for terminating the heating of said work piece by said inductor when the total amount of power received by said work piece reaches a predetermined value.

8. In an induction heating apparatus having an inductor connected by a power circuit to a source of A. C. supply for heating a work piece disposed in inductive relation to said inductor, a first power measuring device electrically connected to said power circuit to measure the power supplied to said inductor, a second power measuring device electrically connected to said power circuit to measure the power loss in said inductor, each of said power measuring devices including a rotatable armature and a set of voltage and current coils for producing a torque thereon, a shaft connected to said armatures and differentially actuated thereby, control means operated by said shaft for terminating heating of said work piece by said inductor, and temperature control means comprising a variable voltage transformer connected in circuit with said current coils for adjusting the power-torque ratio between said power circuit and said armatures, said transformer being initially adjusted to provide the desired temperature to which the work piece will be heated.

DONALD I. BOHN.

REFERENCES CITED

The following references are of record in the file of this patent:

UNITED STATES PATENTS

| Number | Name | Date |
|---|---|---|
| 1,230,357 | Woodrow | June 19, 1917 |
| 1,367,124 | Colby | Feb. 1, 1921 |
| 1,936,192 | Hammond | Nov. 21, 1933 |
| 2,090,692 | Melton | Aug. 24, 1937 |
| 2,381,310 | Richter | Aug. 7, 1945 |